Jan. 7, 1958 — W. E. STANLEY, JR., ET AL — 2,818,733
SELF-CLOSING LIQUID RECEIVER
Filed April 20, 1956

INVENTORS:
Ernest Fruehauf
William E. Stanley, Jr.
BY Michael Duffney
ATTORNEY

United States Patent Office 2,818,733
Patented Jan. 7, 1958

2,818,733

SELF-CLOSING LIQUID RECEIVER

William E. Stanley, Jr., Crete, and Ernest Fruehauf, Chicago, Ill., assignors to Standard Oil Company, Chicago, Ill., a corporation of Indiana Application April 20, 1956, Serial No. 579,637

4 Claims. (Cl. 73—426)

This invention relates to liquid receivers. More particularly it relates to a liquid receiver which automatically closes when a predetermined amount of liquid has entered the vessel.

In many operations involving the processing of liquids, it is necessary to divide the liquid product into cuts or fractions, these fractions normally being of equal volume. For example, in clarifying of water containing sediment by passage through a bed of Fiberglas, it is desirable to determine the point at which sediment begins to pass through the bed and also the point at which no further clarification is being obtained. It is customary to have an individual follow the clarification procedure withdrawing samples of the effluent into separate bottles and visually determining the various cut points. It is obvious that a considerable expenditure of man-power over a prolonged period of hours may be necessary in order to obtain all the information needed in the particular test. Some means whereby effluent cuts could be taken automatically without loss of effluent by evaporation would save considerable man-power and probably give more accurate results since immediate decisions would be unnecessary.

Another problem which faces the worker is the taking of fractions during the course of a distillation of a multi-component liquid. An automatic means whereby constant volume fractions could be taken automatically of the distillate product would eliminate the need for individual standing and watching the distillation which may take many hours.

An object of the invention is a self-closing liquid receiver. Another object is a self-closing liquid receiver adapted to prevent loss of liquid from the vessel and permitting the entry of predetermined volume of liquid. Other objects will become apparent in the course of the description of the invention.

The self-closing liquid receiver of the invention comprises a vessel such as a bottle which has a means such as a neck for the entry of liquid into the interior of the bottle or vessel. Inside the vessel is a float means which responds to the liquid rising within the vessel and is adapted to fit against the conduit entering the vessel and preventing further entry of liquid or escape of liquid or vapors from within the vessel. A side-arm conduit mounted in the neck of the filling conduit permits liquid to flow from the neck through the side arm into another receiver after the float means has prevented further entry of liquid into the first liquid receiver.

Figures 1, 2:
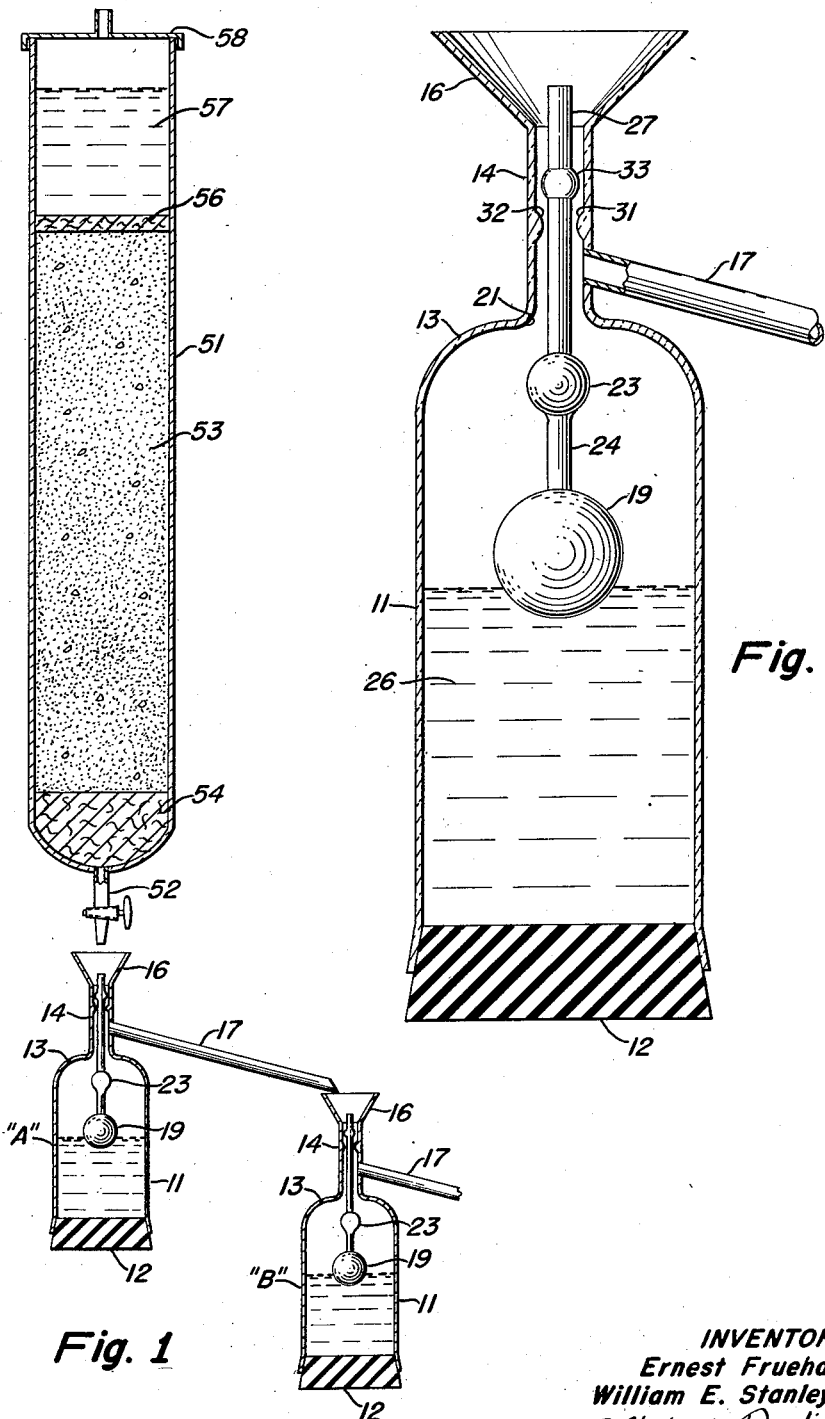
Figure 1 shows one embodiment of the use of the invention in a multi-fraction receiving operation.
Figure 2 shows in larger scale one of the self-closing liquid receivers depicted in Figure 1.

It is to be understood that the self-closing liquid receiver shown in the figures represents only a preferred embodiment of the invention and that the invention is not to be limited to the exact details shown in the figures.

In Figure 2, the self-closing liquid receiver comprises a vessel 11. Vessel 11 may have a permanent lower end-closure such as is present in a bottle or the lower end-closure 12 may be removable, for example, a rubber or cork stopper adapted to fit into the lower end opening of vessel 11. In this illustration, vessel 11 is provided with a rubber stopper lower end-closure 12. Thus the interior of vessel 11 may be made readily accessible for cleaning.

Vessel 11 is also provided with an upper end-closure 13. Upper end-closure 13 has positioned therein a filling conduit 14. Filling conduit 14 permits flow of liquid into the interior of vessel 11. Filling conduit 14 may also be described as a neck-like conduit, for example, the neck of a bottle. In this embodiment, a funnel-like conduit 16 is affixed to the upper end of filling conduit 14.

A side-arm conduit 17 extends downwardly from said filling conduit. Side-arm conduit 17 opens into the interior of filling conduit 14. Side-arm conduit may be a relatively straight piece of tubing or it may be bent in a goose-neck shape to facilitate collection of liquid passing through conduit 17 from neck-like conduit 14.

Within vessel 11, there is a float means 19. In this instance, float means 19 is essentially a sphere. The lower end 21 of conduit 14, or, more accurately, the junction of the upper end-closure 13 and the conduit 14 is shaped so that the float means positioned at that point will close the conduit and prevent further entry of liquid into vessel 11 or passage of vapors and the like out of vessel 11 by way of conduit 14. Float means 19 responds to the action of liquid entering vessel 11 through filling conduit 14 and rises until it enters the lower end 21 of said filling conduit 14 and closes said lower end 21.

In the preferred embodiment as shown in Figure 2, the complete float means comprises float 19, which is responsive to the action of liquid entering vessel 11 through conduit 14. A closure means 23 is affixed to float 19 by means of element 24. In this embodiment, float 19 is a glass ball, closure 23 is a glass ball and element 24 is a glass tube connecting the two. Closure means 23 and lower end 21 of conduit 14 are adapted to make a tight seal when end 21 and closure means 23 come together in response to the rise of liquid 26 within the vessel 11 acting on float 19. A centering element 27 extends into conduit 14 and is affixed to closure means 23. In this embodiment, centering element 27 is a glass rod. Centering element 27 is long enough so that when the vessel is free of liquid the upper end of element 27 extends into at least the lower portion of conduit 14. Centering element 27 is preferably made long enough to extend beyond opening 16, so that closure means 23 may be forced away from lower end 21 by pressure imposed on the external end of element 27. Thus the contacts of vessel 11 may be emptied through filling conduit 14.

In the particular embodiment shown in the figures, filling conduit 14 is provided with internal spur-like means 31 and 32 and two others not shown. Centering element 27 is provided with a means 33 which permit the spur-like means 31, etc. to support said float means, i. e., so that float 19 does not touch the interior surface of closure 12. The spur-like means 31, etc. may be simple dimples pushed into the sides of the neck of the bottle being used as the receiver. The means 33 on centering element 27 may be simply a bulbous portion blown into the glass tube forming element 27. By positioning the means 23 on centering element 27 at the proper place, it is possible to very accurately control the amount of liquid which will be received by vessel 11 before closure means 23 enters junction 21 and bars further entering of liquid in vessel 11. The provision of the support means 33 for the float means reduces breakage in handling of the receiver when it is made of glass. It is to be understood that a particular receiver may be adapted to receive different amounts of liquid by adding material, such as glass beads, to the interior of vessel 11.

In Figure 1, there is shown a portion of the receiver train which is used in collecting filtrate during a decolorizing of the oil operation. The receivers have been numbered as the receiver in Figure 2; certain elements have not been numbered in order to avoid crowding. However, it is considered that no confusion can result from the omission of these numbers. In the illustration shown in Figure 1, which shows one mode of operation of the receiver, glass column 51, which is provided with a stop cock 52 at its bottom, is packed with a bed of fuller's earth 53. The fuller's earth is retained at the bottom of the column 51 by means of glass wool 54. A layer of glass wool 56 is positioned at the top of the bed of fuller's earth to prevent channeling and disturbance when oil 57 is introduced into the column 51. A fitted cover 58 is positioned on the mouth of column 51. In this embodiment, it is desired to determine the yield of oil of a final color and also oil of average color by passage through the particular fuller's earth charged to the column 53, for example, a technical grade white oil which must have a final average color of about 25 Saybolt.

This percolation normally will take 2 to 7 days to complete. A number of receivers A, B, etc. are placed below the stop cock 52 so that liquid may flow by means of side arms 17, etc. from one receiver to the next lower receiver and so forth. In this operation, each receiver has been calibrated to receive 50 ml. of oil. Thus stop cock 52 is adjusted to flow oil at the desired rate in ml. per minute and the filtrate is directed into receiver A positioned directly below the column 51. Float 19 in receiver A rises until, when 50 ml. have entered vessel 11 of receiver A, closure 23 closes the end of the filling conduit. As liquid continues to drip from the column by way of stop cock 52 into filling conduit 14 of receiver A, this liquid flows by way of side arm 17 of receiver A into the filling conduit of receiver B. When the second 50 ml. have been received by receiver B, the filtrate is then directed by side arm 17 of receiver B to receiver C not shown. Sufficient receivers are positioned into the train or periodically, at the convenience of the operator, introduced into the train so that more oil is received by the receivers than is required to determine the yield. The color of the final cut point oil required to give the average color is very readily determined by inspection of the contents of the individual receivers. (When the oil being percolated is in the ASTM-Union color range, inspections are facilitated with receivers made of a diameter and thickness such that they may be placed directly into the ASTM-Union colorimeter.)

The receivers may be constructed so that there is essentially no free space between the end of the filling conduit 14 and the bottom of side arm conduit 17, thereby avoiding the formation of a pocket of oil above closure means 23 or where the volume of material is so slight as to not impair appreciably the final results, a gap may be left as is shown in Figure 2. In the receivers as utilized in the actual illustrative operation, the gap has been reduced to such a point that there is essentially no material collected above closure means 23 in each of the receivers.

It is self-evident that by means of the self-closing liquid receiver of the invention the problem of receiving a multiplicity of liquid fractions without wastage of man-power in charge of the receivers as each particular fraction is collected has been overcome in a simple convenient and economical fashion.

Thus having described the invention what is claimed is:

1. A self-closing liquid receiver comprising a vessel provided with an upper end-closure, a filling conduit positioned in said upper end-closure, a side-arm conduit extending downwardly from said filling conduit and a float means within said vessel adapted to close the lower end of said filling conduit by rising to that position in response to the action of liquid entering said vessel through said filling conduit.

2. A self-closing liquid receiver comprising a vessel provided with an upper end-closure, a neck-like conduit positioned in said upper end-closure, a side-arm conduit communicating with and extending downwardly from said neck-like conduit, and a float means comprising a float, responsive to the action of liquid entering said vessel through said neck-like conduit, a closure means affixed to said float adapted to close the vessel-end of said neck-like conduit, said float and said closure-means being located within said vessel, and a centering element extending from said closure-means to a point within said neck-like conduit.

3. The receiver of claim 2 wherein said vessel is provided with a stopper-like lower end-closure.

4. The receiver of claim 2 wherein said neck-like conduit is provided with internal spur-like means and said centering element is provided with means permitting said spur-like means to support said float means.

No references cited.